United States Patent
Ellison et al.

(10) Patent No.: US 7,516,330 B2
(45) Date of Patent: Apr. 7, 2009

(54) PLATFORM AND METHOD FOR ESTABLISHING PROVABLE IDENTITIES WHILE MAINTAINING PRIVACY

(75) Inventors: Carl M. Ellison, Portland, OR (US); James A. Sutton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 11/289,747

(22) Filed: Nov. 29, 2005

(65) Prior Publication Data

US 2006/0080528 A1      Apr. 13, 2006

Related U.S. Application Data

(63) Continuation of application No. 09/605,605, filed on Jun. 28, 2000, now Pat. No. 6,976,162.

(51) Int. Cl.
*H04L 9/00* (2006.01)
(52) U.S. Cl. .......................... 713/180; 713/156
(58) Field of Classification Search ................. 713/156, 713/180
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. ............... 711/166 |
| 4,276,594 A | 6/1981 | Morley |
| 4,278,837 A | 7/1981 | Best |
| 4,307,447 A | 12/1981 | Provanzano et al. |

(Continued)

FOREIGN PATENT DOCUMENTS

DE      4217444      12/1992

(Continued)

OTHER PUBLICATIONS

Schneier (Bruce Schneier, "Applied Cryptography, Protocols, Algorithms and Source Code in C", 2nd edition, 1996 ISBN: 0471128457), p. 34-35 and 38.*

(Continued)

*Primary Examiner*—Andrew L Nalven
*Assistant Examiner*—Peter Poltorak
(74) *Attorney, Agent, or Firm*—Blakely, Sokoloff, Taylor & Zafman LLP

(57) ABSTRACT

In one embodiment, a method for utilizing a pseudonym to protect the identity of a platform and its user is described. The method comprises producing a pseudonym that includes a public pseudonym key. The public pseudonym key is placed in a certificate template. Hash operations are performed on the certificate template to produce a certificate hash value, which is transformed from the platform. Thereafter, a signed result is returned to the platform. The signed result is a digital signature for the transformed certificate hash value. Upon performing an inverse transformation of the signed result, a digital signature of the certificate hash value is recovered. This digital signature may be used for data integrity checks for subsequent communications using the pseudonym.

21 Claims, 4 Drawing Sheets

U.S. PATENT DOCUMENTS

| | | | |
|---|---|---|---|
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,621,318 A | 11/1986 | Maeda | 364/200 |
| 4,759,063 A * | 7/1988 | Chaum | 380/30 |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,121 A * | 4/1996 | Yacobi | 705/69 |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A * | 2/1997 | Brands | 380/30 |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,844 A * | 2/1999 | Yacobi | 705/69 |
| 5,872,994 A | 2/1999 | Akiyama et al. | |
| 5,878,138 A * | 3/1999 | Yacobi | 705/69 |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | 364/200 |
| 5,953,502 A | 9/1999 | Helbig, Sr. | |
| 5,956,408 A | 9/1999 | Arnold | |
| 5,970,147 A | 10/1999 | Davis | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,052,467 A * | 4/2000 | Brands | 380/279 |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne et al. | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |

| | | |
|---|---|---|
| 6,282,657 B1 | 8/2001 | Kaplan et al. |
| 6,292,874 B1 | 9/2001 | Barnett ................. 711/153 |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. .......... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,526,509 B1 | 2/2003 | Horn et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,871,276 B1 * | 3/2005 | Simon ................. 713/156 |
| 7,023,994 B1 | 4/2006 | Dupre |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |
| 2004/0266523 A1 * | 12/2004 | Gentles et al. ............ 463/29 |
| 2005/0066164 A1 * | 3/2005 | Simon ................. 713/156 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0755136 A2 | 1/1997 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO 99/08466 | 2/1999 |
| WO | WO9905600 | 2/1999 |
| WO | WO9909482 | 2/1999 |
| WO | WO9918511 | 4/1999 |
| WO | 0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175564 | 10/2001 |
| WO | WO0175565 | 10/2001 |
| WO | WO0175595 | 10/2001 |
| WO | WO0201794 | 1/2002 |
| WO | WO0217555 | 2/2002 |
| WO | WO02060121 | 8/2002 |
| WO | WO02086684 | 10/2002 |
| WO | WO03058412 | 7/2003 |

OTHER PUBLICATIONS

Berg, Cliff, "How Do I Create a Signed Applet?", *Dr. Dobb's Journal*, (Aug. 1997),1-9.

Brands, Stefan, "Restrictive Blinding of Secret-Key Certificates", *Springer-Verlag* XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, "Trusted Computing Platform Alliance (TCPA) Main Specification Version 1.1a", XP002272822, (Jan. 25, 2001),1-321.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICDD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", Fabry, R.S., "*Capability-Based Addressing*," Communications of the ACM, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li, et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002),1-10.

IBM, "Information Display Technique for a Terminate Stay Resident Program IBM Technical Disclosure Bulletin", TDB-ACC-No. NA9112156, vol. 34, Issue 7A, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", vol. 3: *System Programming Guide*, Intel Corporation—2003,13-1 through 13-24.

Intel, "Intel386 DX Microprocessor 32-Bit CHMOS Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avioncs Computers", *IEEE AES Systems Magazine*, XP002190614,(Mar. 1999).

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

Motorola, "M68040 User's Manual", (1993),1-1 to 8-32.

Nanba, S., et al., "VM/4: ACOS-4 Virtual Machine Architecture", *VM/4: ACOS-4 Virtual Machine Architecture, IEEE*, (1985),171-178.

Richt, Stefan, et al., "In-Circuit-Emulator Wird Echtzeittauglich", *Elektronic Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999), 185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithm, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001).

* cited by examiner

PLATFORM AND METHOD FOR ESTABLISHING PROVABLE IDENTITIES WHILE MAINTAINING PRIVACY

This application is a continuation of U.S. patent application Ser. No. 09/605,605, filed Jun. 28, 2000, now U.S. Pat. No. 6,976,162.

FIELD

This invention relates to the field of data security. In particular, the invention relates to a platform and method that protects an identity of the platform through creation and use of pseudonyms.

BACKGROUND

Advances in technology have opened up many opportunities for applications that go beyond the traditional ways of doing business. Electronic commerce (e-commerce) and business-to-business (B2B) transactions are now becoming popular, reaching the global markets at a fast rate. Unfortunately, while electronic platforms like computers provide users with convenient and efficient methods of doing business, communicating and transacting, they are also vulnerable for unscrupulous attacks. This vulnerability has substantially hindered the willingness of content providers from providing their content in a downloaded, digital format.

Currently, various mechanisms have been proposed to verify the identity of a platform. This is especially useful to determine if the platform features a "trusted" device; namely, the device is configured to prevent digital content from being copied in a non-encrypted format without authorization. One verification scheme involves the use of a unique serial number assigned to a platform for identification of that platform. Another verification scheme, performed either independently from or cooperatively with the previously described verification scheme, involves the use of a permanent key pair. The permanent key pair includes (i) a unique public key that identifies the platform and (ii) a private key that is permanently stored in memory of the trusted device. The private key is confidential and is not provided outside the trusted device. However, these verification schemes pose a number of disadvantages.

For example, each of these verification schemes is still subject to data aggregation attacks. "Data aggregation" involves the collection and analysis of data transmitted from a platform over a period of time. Thus, the use of platform serial numbers and permanent keys for identification purposes has recently lead to consumer privacy concerns. Also, for both verification mechanisms, a user cannot easily and reliably control access to and use of the platform identity on a per-use basis.

BRIEF DESCRIPTION OF THE DRAWINGS

The features and advantages of the present invention will become apparent from the following detailed description of the present invention in which.

DETAILED DESCRIPTION

Figure 1:
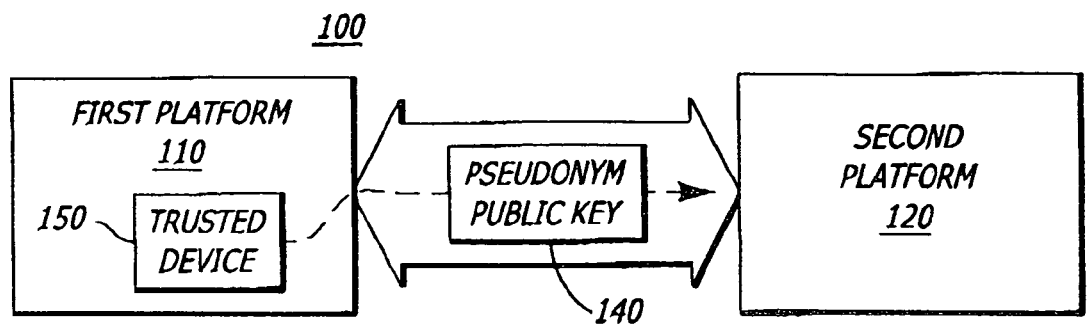
FIG. 1 is a block diagram of an illustrative embodiment of a system utilizing the present invention.

The present invention relates to a platform and method for protecting the identity of the platform through the creation and use of pseudonyms. Herein, certain details are set forth in order to provide a thorough understanding of the present invention. It is apparent to a person of ordinary skill in the art, however, that the present invention may be practiced through many embodiments other that those illustrated. Well-known circuits and cryptographic techniques are not set forth in detail in order to avoid unnecessarily obscuring the present invention.

In the following description, terminology is used to discuss certain features of the present invention. For example, a "platform" includes hardware and/or software that process information. Examples of a platform include, but are not limited or restricted to any of the following: a computer (e.g., desktop, a laptop, a hand-held, a server, a workstation, etc.); data transmission equipment (e.g., a router, switch, facsimile machine, etc.), wireless equipment (e.g., cellular base station, telephone handset, etc.); or television set-top box. "Software" includes code that, when executed, performs a certain function. "Information" is defined as one or more bits of data, address, and/or control.

With respect to cryptographic functionality, a "cryptographic operation" is an operation performed for additional security on information. These operations may include encryption, decryption, hash computations, and the like. In certain cases, the cryptographic operation requires the use of a key, which is a series of bits. For asymmetric key cryptography, a device is associated with unique, permanent key pair that includes a public key and a private key.

In addition, asymmetric key cryptography normally utilizes a root certificate. A "root certificate" is a public key at the origination of a digital certificate chain and provides a starting point for all subsequent digital certificates. In general, a "digital certificate" includes information used to authenticate a sender of information. For example, in accordance with CCITT Recommendation X.509: The Directory—Authentication Framework (1988), a digital certificate may include information (e.g., a key) concerning a person or entity being certified, namely encrypted using the private key of a certification authority. Examples of a "certification authority" include an original equipment manufacturer (OEM), a software vendor, a trade association, a governmental entity, a bank or any other trusted business or person. A "digital certificate chain" includes an ordered sequence of two or more digital certificates arranged for authorization purposes as described below, where each successive certificate represents the issuer of the preceding certificate.

A "digital signature" includes digital information signed with a private key of its signatory to ensure that the digital information has not been illicitly modified after being digitally signed. This digital information may be provided in its entirety or as a hash value produced by a one-way hash operation.

A "hash operation" is a one-way conversion of information to a fixed-length representation referred to as a "hash value". Often, the hash value is substantially less in size than the original information. It is contemplated that, in some cases, a 1:1 conversion of the original information may be performed. The term "one-way" indicates that there does not readily exist an inverse function to recover any discernible portion of the original information from the fixed-length hash value.

Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

Referring to FIG. 1, a block diagram of an illustrative embodiment of a system 100 utilizing the present invention is shown. The system 100 comprises a first platform 110 and a second platform 120. First platform 110 is in communication with second platform 120 via a link 130. A "link" is broadly defined as one or more information-carrying mediums (e.g., electrical wire, optical fiber, cable, bus, or wireless signaling technology). When requested by the user, first platform 110 generates and transmits a pseudonym public key 140 (described below) to second platform 120. In response, second platform 120 is responsible for certifying, when applicable, that pseudonym public key 140 was generated by a trusted device 150 within first platform 110.

Figure 2:
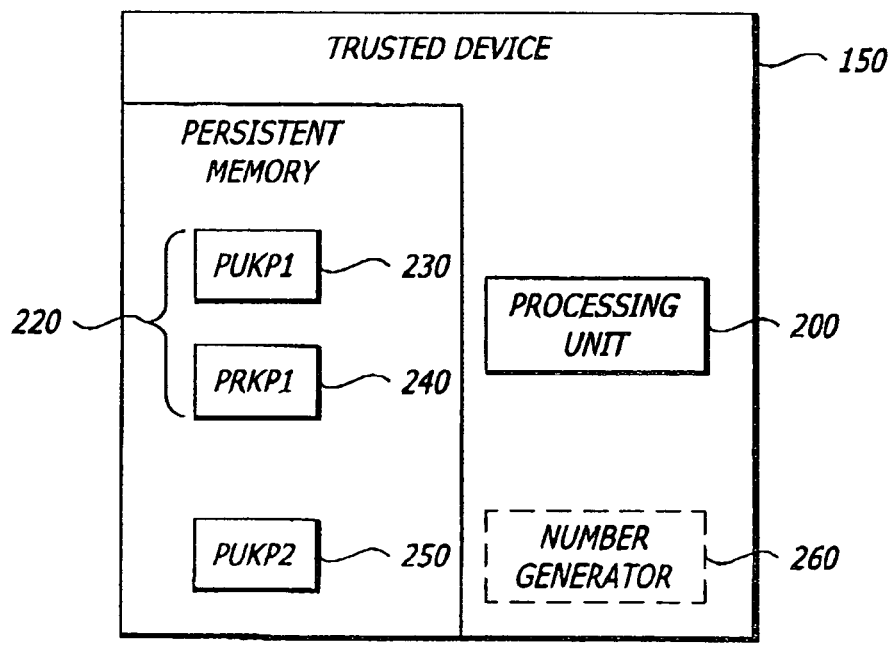
FIG. 2 is a block diagram of an illustrative embodiment of the trusted logic employed within the first platform of FIG. 1.

Referring now to FIG. 2, in one embodiment, trusted device 150 comprises hardware and/or protected software. Software is deemed "protected" when access control schemes are employed to prevent unauthorized access to any routine or subroutine of the software. More specifically, device 150 is one or more integrated circuits that prevents tampering or snooping from other logic. The integrated circuit(s) may be placed in a single integrated circuit (IC) package or a multi-IC package. A package provides additional protection against tampering. Of course, device 150 could be employed without any IC packaging if additional protection is not desired.

Herein, device 150 comprises a processing unit 200 and a persistent memory 210 (e.g., non-volatile, battery-backed random access memory "RAM", etc.). Processing unit 200 is hardware that is controlled by software that internally processes information. For example, processing unit 200 can perform hash operations, perform logical operations (e.g. multiplication, division, etc.), and/or produce a digital signature by digitally signing information using the Digital Signature Algorithm. Persistent memory 210 contains a unique asymmetric key pair 220 programmed during manufacture. Used for certifying pseudonyms, asymmetric key pair 220 includes a public key (PUKP1) 230 and a private key (PRKP1) 240. Persistent memory 210 may further include a public key 250 (PUKP2) of second platform 120, although it may be placed in volatile memory (e.g., RAM, register set, etc.) within device 150 if applicable.

In this embodiment, device 150 further comprises a number generator 260 such as a random number generator or a pseudo-random number generator. Number generator 260 is responsible for generating a bit stream that is used, at least in part, to produce one or more pseudonyms. A "pseudonym" is an alias identity in the form of an alternate key pair used to establish protected communications with another platform and to identify that its platform includes trusted device 150. The pseudonym also supports a challenge/response protocol and a binding of licensing, secrets and other access control information to the specific platform. It is contemplated, however, that number generator 260 may be employed externally from device 150. In that event, the greater security would be realized by platform 110 if communications between number generator 260 and device 150 were protected.

Figure 3:
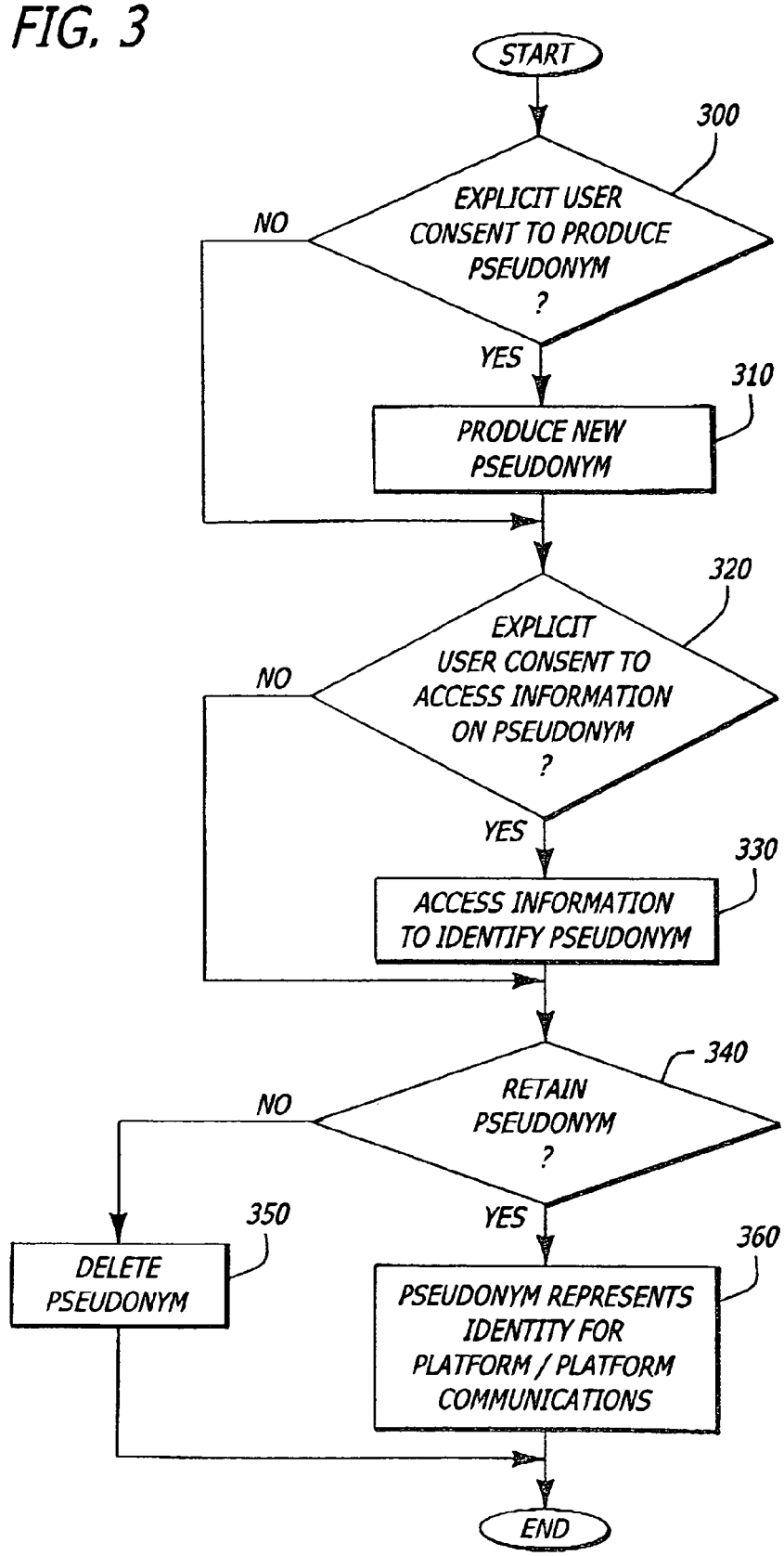
FIG. 3 is a flowchart of an illustrative embodiment describing allocation and use of a pseudonym produced within the first platform of FIG. 1.

Referring to FIG. 3, a flowchart of an illustrative embodiment describing allocation and use of a pseudonym is shown. To fully protect the user's privacy, the user should have positive control of the production, allocation and deletion of pseudonyms. Thus, in response to explicit user consent, a new pseudonym is produced (blocks 300 and 310). Also, to access information (e.g., label, public key, etc.) that identifies an existing pseudonym, explicit user consent is needed (blocks 320 and 330). Explicit user consent may be given by supplying a pass-phrase (e.g., series of alphanumeric characters), a token, and/or a biometric characteristic to the trusted device. For example, in one embodiment, a user pass-phrase may be entered through a user input device (e.g., a keyboard, mouse, keypad, joystick, touch pad, track ball, etc.) and transferred to the trusted device. In another embodiment, memory external to the logic may contain pseudonyms encrypted with a hash value of a user pass-phrase. Any of these pseudonyms can be decrypted for use by again supplying the user pass-phrase.

Once a pseudonym has been produced and allocated for use in communications with a remote platform, this pseudonym represents the persistent platform identity for that platform/platform communications, so long as the user chooses to retain the pseudonym (blocks 340, 350 and 360).

Figure 4:
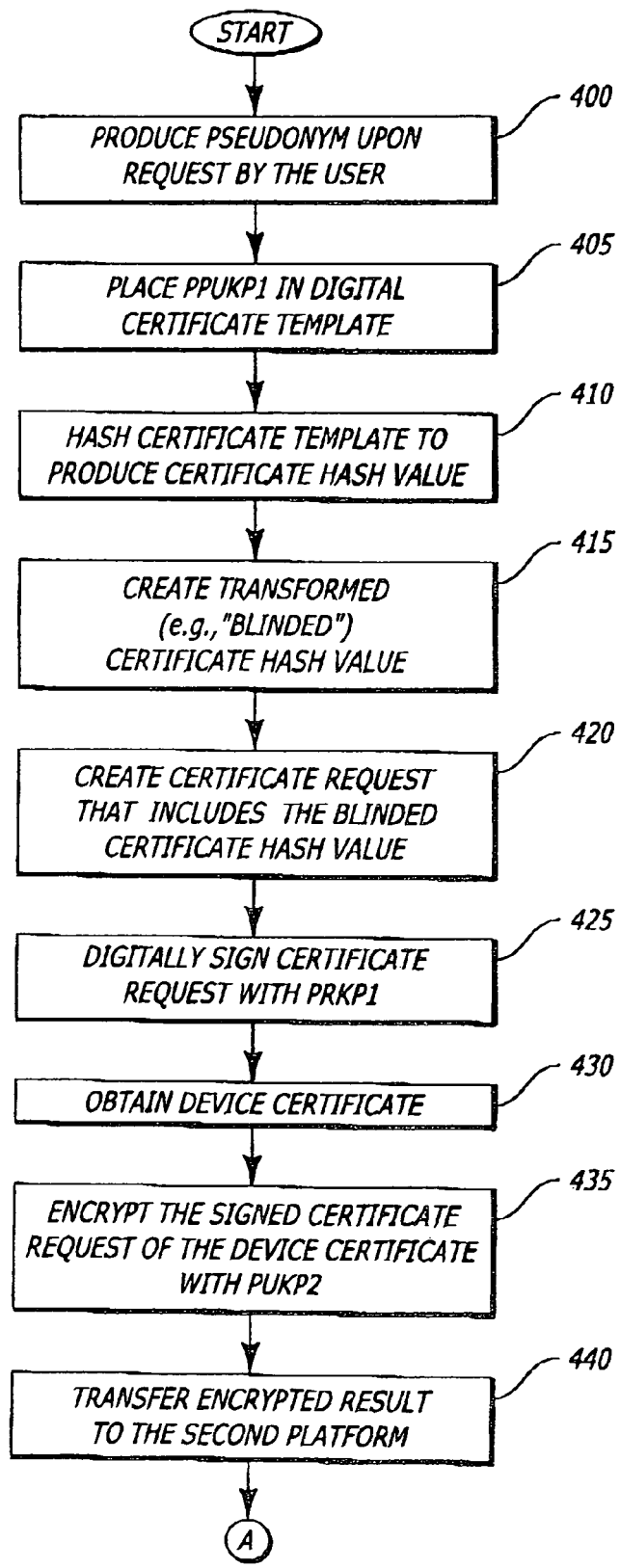
FIGS. 4 and 5 are flowcharts of an illustrative embodiment of the production and certification of pseudonyms.
Figure 5:
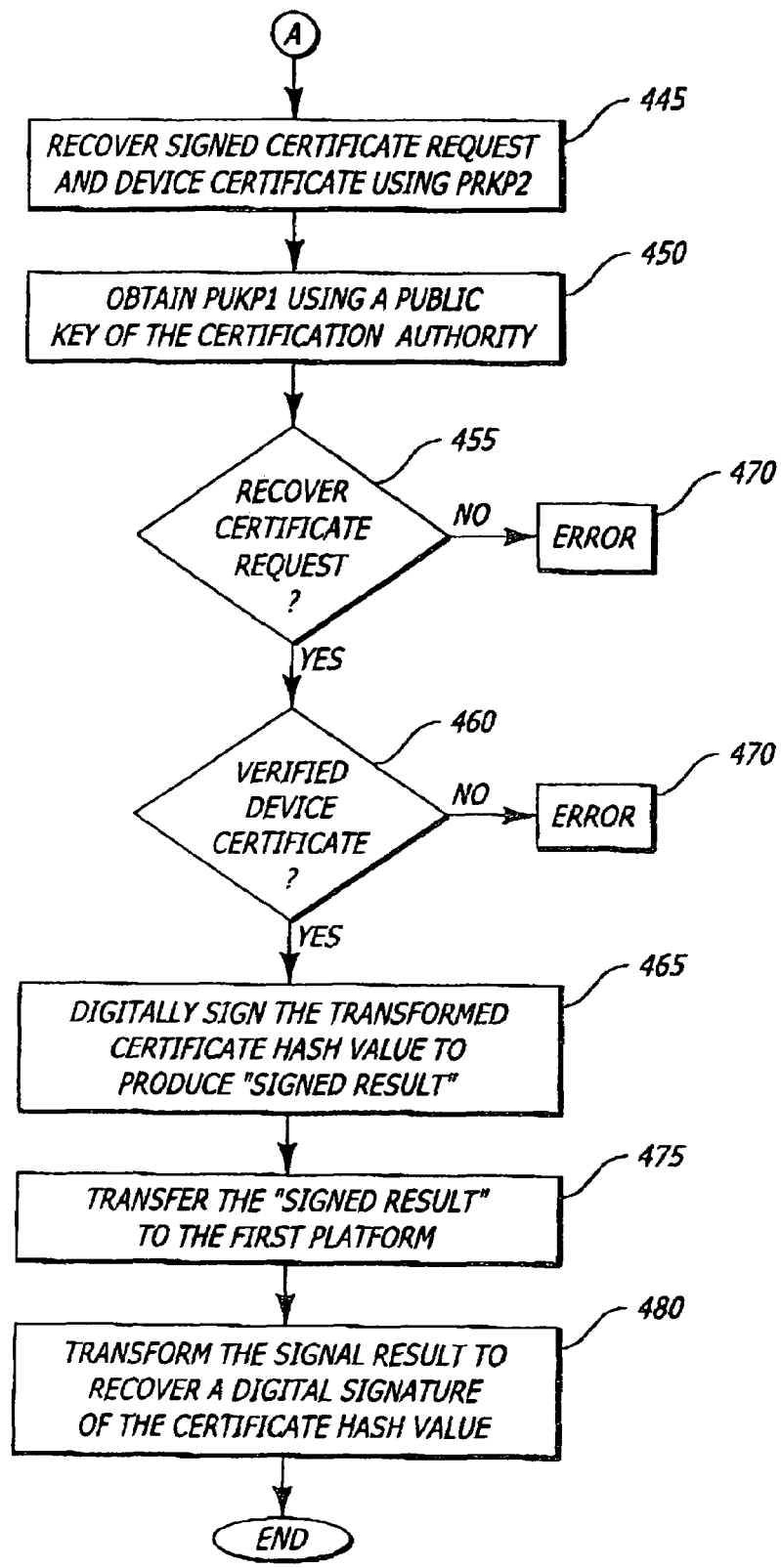

Referring now to FIGS. 4 and 5, flowcharts of an illustrative embodiment of the production and certification of pseudonyms are shown. Initially, upon receiving a request by the user, the pseudonym is produced by the device in coordination with a number (block 400). A pseudonym public key (PPUKP1) is placed in a digital certificate template (block 405). The digital certificate template may be internally stored within the first platform or provided by the second platform in response to a request for certification from the first platform. Thereafter, the digital certificate template undergoes a hash operation to produce a certificate hash value (block 410).

Thereafter, the certificate hash value undergoes a transformation similar to that described in U.S. Pat. Nos. 4,759,063 and 4,759,064 to create a "blinded" certificate hash value (block 415). In particular, the certificate hash value is multiplied by a pseudo-random number (e.g., a predetermined number raised to a power that is pseudo-randomly select). The pseudo-random power is maintained in confidence within the first platform (e.g., placed in persistent memory 210 of FIG. 2).

A certification request, including at least the transformed (or blinded) certificate hash value, is created (block 420). The certification request is digitally signed with the private key (PRKP1) of the first platform (block 425). A device certificate, namely a digital certificate chain that includes the public key (PUKP1) of the first platform in one embodiment, is retrieved or generated to accompany the signed certificate request (block 430). In this embodiment, the device certificate features a high-level certificate including PUKP1 and a lowest level certificate including the root certificate. Of course, the device certificate may be a single digital certificate including PUKP1. Both the signed certificate request and device certificate are encrypted with the public key (PUKP2) of the second platform and then transferred to the second platform (blocks 435 and 440).

At the second platform, the signed certificate request and device certificate are recovered after being decrypted using the private key (PRKP2) of the second platform (block 445). The public key (PUKP1) of the first platform may be obtained using a public key of the certification authority responsible for signing the device certificate (block 450). If the second platform can recover the certificate request, the second platform verifies the device certificate back to the root certificate (blocks 455 and 460). If the certificate request is recovered and the device certificate is verified, the transformed (or blinded) certificate hash value is digitally signed to produce a "signed result" (block 465). Otherwise, if either the transformed (or blinded) certificate hash value cannot be determined or the device certificate cannot be verified, an error message is returned to the first platform (block 470).

Upon receipt of the signed result from the second platform, the first platform performs an inverse transformation on the signal result. For example, in this illustrative embodiment, the first platform divides the signed result by an inverse of the pseudo-random number (e.g., the predetermined number raised to an inverse of the pseudo-random power) to recover a digital signature of the certificate hash value (blocks 475 and 480). The digital signature is stored with one or more pseudonyms for use in subsequent communications with other platforms to identify that the first platform includes a trusted device.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   producing a pseudonym including a public pseudonym key within a first platform;
   placing the public pseudonym key into a certificate template;
   performing a hash operation on the certificate template to produce a certificate hash value;
   performing a transformation on the certificate hash value to create a blinded certificate hash value, the performing of the transformation includes performing a logical operation on the certificate hash value using a pseudo-random number to produce a value differing from the certificate hash value, the pseudo-random number being a predetermined value raised to a pseudo-randomly selected power;
   creating a certificate request including the blinded certificate hash value;
   digitally signing the certificate request with a private key of the first platform to produce a signed certification request;
   transferring the signed certificate request with a device certificate including a public key of the first platform; and
   encrypting the signed certificate request and the device certificate with a public key of a second platform targeted to receive the signed certificate request and the device certificate.

2. The method of claim 1, wherein the producing of the pseudonym includes generating the public pseudonym key and a private pseudonym key corresponding to the public pseudonym key.

3. The method of claim 1, wherein the placing of the public pseudonym key into the certificate template includes writing the public pseudonym key into a field of the certificate template.

4. The method of claim 1, wherein an inverse of the pseudo-random number is a predetermined value raised to an inverse power designated by a pseudo-random value and the inverse of the pseudo-random number is used to recover a digital signature received in response to the certificate request.

5. The method of claim 1 further comprising
   recovering by the second platform the public key of the first platform from the device certificate using a public key of a certification authority, the public key being used to recover and verify the device certificate.

6. The method of claim 5 further comprising:
   digitally signing the blinded certificate hash value to produce a signed result; and
   transferring the signed result back to the first platform.

7. A platform comprising:
   a transceiver; and
   a device in communication with the transceiver, the device including a persistent memory to contain a permanent key pair, at least one pseudonym being an alternative key pair generated internally within the device and used in lieu of the permanent key pair to establish secured communications via transmissions from the transceiver to a remote platform, the device comprising a processing unit to:
   write a public pseudonym key into a certificate template,
   perform a hash operation on the certificate template to produce a certificate hash value,
   perform a transformation on the certificate hash value to create a blinded certificate hash value, the transformation including a logical operation on the certificate hash value using a pseudo-random number to produce a value differing from the certificate hash value,
   create a certification request including the blinded certificate hash value,
   digitally sign the certification request with a private key of the platform to produce a signed certification request,
   append the signed certification request with a device certificate that includes at least a public key of the platform,
   encrypt the signed certification request and the device certificate with a public key of the remote platform.

8. The platform of claim 7, wherein the processing unit further
   transfers the encrypted signed certification request and the device certificate to the remote platform for recovery of the certification and verification of the device certificate, the remote platform producing a signed result if the certification request is recovered and the device certificate is verified.

9. The platform of claim 8, wherein the processing unit of the device further performs an inverse transformation on the signed result to recover a digital signature of the certificate hash value.

10. The platform of claim 9, wherein the processing unit further stores the digital signature with the at least one pseudonym in a subsequent communication with another platform to identify that the platform includes a trusted device.

11. The platform of claim 8, wherein the processing unit of the device further divides the signed result by an inverse of the pseudo-random number to recover a digital signature of the certificate hash value.

12. A method comprising:
    producing a pseudonym within a first platform, the pseudonym representing a persistent identity of the first platform so long as a user chooses to retain the pseudonym;
    performing a hash operation on a certificate template including pseudonym to produce a certificate hash value;
    performing a transformation on a certificate hash value to create a blinded certificate hash value by multiplying the certificate hash value, being a hash value of information including the pseudonym, by a pseudo-random number generated within and maintained by the first platform, the pseudo-random number being a predetermined value raised to a pseudo-randomly selected power; and
    transmitting the pseudonym in an obfuscated format to a second platform;
    wherein the transmitting of the pseudonym comprises:
    creating a certificate request including the blinded certificate hash value, digitally signing the certification request with a private key of the first platform to produce a signed certification request, transferring the signed certificate request with a device certificate including a public key of the first platform, and encrypting the signed certificate request and the device certificate with a public key of a second platform targeted to receive the signed certificate request and the device certificate.

13. The method of claim 12, wherein the private key of the first platform and the public key of the first platform are permanently stored and associated with the first platform.

14. The method of claim 12, wherein the producing of the pseudonym includes generating the public pseudonym key and a private pseudonym key corresponding to the public pseudonym key.

15. The method of claim 14, wherein prior to performing the hash operation, the method further comprises placing the public pseudonym key into the certificate template by writing the public pseudonym key into a field of the certificate template.

16. The method of claim 12, wherein an inverse of the pseudo-random number is a predetermined value raised to an inverse power designated by the pseudo-random value and is used to recover a digital signature received in response to the certificate request.

17. A method comprising:

producing a pseudonym within a first platform, the pseudonym representing a persistent identity of the first platform so long as a user chooses to retain the pseudonym;

performing a hash operation on a certificate template including pseudonym to produce a certificate hash value;

performing a transformation on a certificate hash value to create a blinded certificate hash value by multiplying the certificate hash value, being a hash value of information including the pseudonym, by a pseudo-random number generated within and maintained by the first platform, the pseudo-random number being a predetermined value raised to a power;

creating a certificate request including the blinded certificate hash value;

digitally signing the certification request with a private key of the first platform to produce a signed certification request;

transferring the signed certificate request with a device certificate including a public key of the first platform; and encrypting the signed certificate request and the device certificate with a public key of a second platform targeted to receive the signed certificate request and the device certificate.

18. The method of claim 17, wherein the private key of the first platform and the public key of the first platform are permanently stored and associated with the first platform.

19. The method of claim 17, wherein the producing of the pseudonym comprises generating the public pseudonym key and a private pseudonym key corresponding to the public pseudonym key.

20. The method of claim 17, further comprising placing the public pseudonym key into the certificate template by writing the public pseudonym key into a field of the certificate template.

21. The method of claim 17, wherein an inverse of the pseudo-random number is a predetermined value raised to an inverse power designated by the pseudo-random value and is used to recover a digital signature received in response to the certificate request.

\* \* \* \* \*